(12) United States Patent
Lain

(10) Patent No.: US 6,447,669 B1
(45) Date of Patent: Sep. 10, 2002

(54) RECYCLING OF GALVANIC CELLS

(75) Inventor: Michael Jonathan Lain, Abingdon (GB)

(73) Assignee: Accentus Plc, Didcot (GB)

( * ) Notice: Subject to any disclaimer, the term of this patent is extended or adjusted under 35 U.S.C. 154(b) by 226 days.

(21) Appl. No.: 09/555,310

(22) PCT Filed: Dec. 3, 1998

(86) PCT No.: PCT/GB98/03599

§ 371 (c)(1),
(2), (4) Date: May 30, 2000

(87) PCT Pub. No.: WO99/34473

PCT Pub. Date: Jul. 8, 1999

(30) Foreign Application Priority Data

Dec. 3, 1997 (GB) .............................................. 9727222

(51) Int. Cl.[7] .............................................. H01M 10/54

(52) U.S. Cl. .............................. 205/705; 205/59; 429/49

(58) Field of Search ...................... 205/705, 59; 429/49

(56) References Cited

FOREIGN PATENT DOCUMENTS

EP          618633 A1  * 10/1994

* cited by examiner

Primary Examiner—Arun S. Phasge
(74) Attorney, Agent, or Firm—William H. Holt

(57) ABSTRACT

Lithium ion cells in which the cathode contains a particulate insertion material and a binder are cut open in a dry, inert atmosphere (10). The cell components are treated with a first organic solvent (12) to dissolve the electrolyte, so that this can be reused. They are then treated with a second organic solvent (16) to dissolve the binder, and the particulate material separated (18) from the solution of binder. The insertion material is then reduced (22) so that it does not contain intercalated lithium. The reduction process may be performed electrolytically.

10 Claims, 3 Drawing Sheets

RECYCLING OF GALVANIC CELLS

This application of a 371 of PCT/GB98/03599 filed Dec. 3, 1998.

This invention relates to a process for treating lithium cells and cell components so that component materials can be safely recovered for reuse, particularly but not exclusively for treating rechargeable lithium ion cells in which both the anode and cathode comprise insertion materials.

Several of the component materials in rechargeable lithium ion cells are potentially valuable, so that their recovery and reuse is clearly desirable. In particular, the cathodes of such cells may contain metal oxides such as lithium cobalt oxide or lithium nickel oxide (or a mixed oxide of the type $LiCo_xNi_{1-x}O_2$); it may be possible to reuse these oxides in this form, although it would usually be preferable if they could be converted to cobalt (II) oxide or nickel (II) oxide (or the mixed oxide) not containing intercalated lithium.

Furthermore the electrolyte may contain ingredients such as lithium tetrafluoroborate or lithium hexafluoro-phosphate which could be reused in making batteries; the latter material however has poor thermal stability, and undergoes hydrolysis in the presence of water. Canon KK have described, in EP 0 613 198A, methods for recovering materials from lithium cells in which an organic solvent is used to dissolve electrolyte material from the cells, but the cathode active material along with polymer binder is merely pulverized.

According to the present invention there is provided a process for treating cells, each cell including particulate cathode material and a binder, an electrolyte, and an anode material, the process comprising the following steps:

a) cutting up the cells in the absence of water;
b) contacting the cells with an organic solvent so as to dissolve out the electrolyte and any electrolyte solvent;
c) then contacting the cells with a solvent for the binder, and thereby separating the particulate material; and
d) reducing the particulate cathode material to remove intercalated ions.

The invention also provides a process for treating cell components comprising particulate cathode material and a binder, the process comprising subjecting the cell component to the steps a) and c), and then performing the step d).

In a preferred method the particulate cathode material is reduced electrochemically. For example lithium cobalt oxide may be reduced to cobalt (II) oxide, thereby also generating lithium hydroxide. The cells may also contain particulate carbon both in the cathode, and as an anode material, the anode incorporating the same binder as in the cathode, so that the particulate material separated in step c) will be a mixture of carbon and cathode material; the particulate carbon does not interfere with the electrochemical reduction process, and indeed it may improve it, as it improves the conductivity of the mixed particle bed. In a modification of this method the particulate material is electrochemically reduced at a circulating particulate bed electrode.

The components of the cells which remain after the two dissolution steps described above are principally the metal foil current collectors from the anode (typically copper) and from the cathode (typically aluminium), the separator, which is typically a non-woven fabric or a micro-porous membrane of a material such as polypropylene, and any cell casing, insulators and seals. These materials can be separated by their density, and possibly by their magnetic properties.

The cutting up of the cells may be performed using a mechanical cutting mechanism, or using a laser. This step is preferably performed in an inert atmosphere, which might for example comprise dry nitrogen. The organic solvent used in step b) to dissolve out the electrolyte preferably also contains no water, and this dissolution step is preferably performed at a temperature which does not exceed for example 60° C., so that potentially unstable electrolyte salts such as lithium hexafluoro-phosphate are not degraded. The dissolution process preferably involves re-circulating the solvent through a vessel containing the cut up cells; the solvent may be recirculated sufficiently vigorously that the cut up cells form a fluidised bed.

The invention will now be further and more particularly described, by way of example only, and with reference to the accompanying drawings in which.

In this example a process will be described for recovering component materials from lithium-ion cells which comprise an anode, an electrolyte, and a cathode, inside a cell casing. The cells may be used cells, or may be cells rejected during manufacturing. The anode consists of a copper foil on which is a coating of carbon particles and PVdF as a binder; the cathode consists of an aluminium foil on which is a coating of lithium cobalt oxide particles, and carbon particles, and PVdF as a binder; the anode and the cathode are separated by a micro-porous polypropylene membrane containing, as electrolyte, lithium hexafluoro-phosphate dissolved in an electrolyte solvent which may contain ethylene carbonate, propylene carbonate, diethyl carbonate, or dimethyl carbonate for example, or mixtures of these. These are all enclosed in a steel casing.

Figure 1:
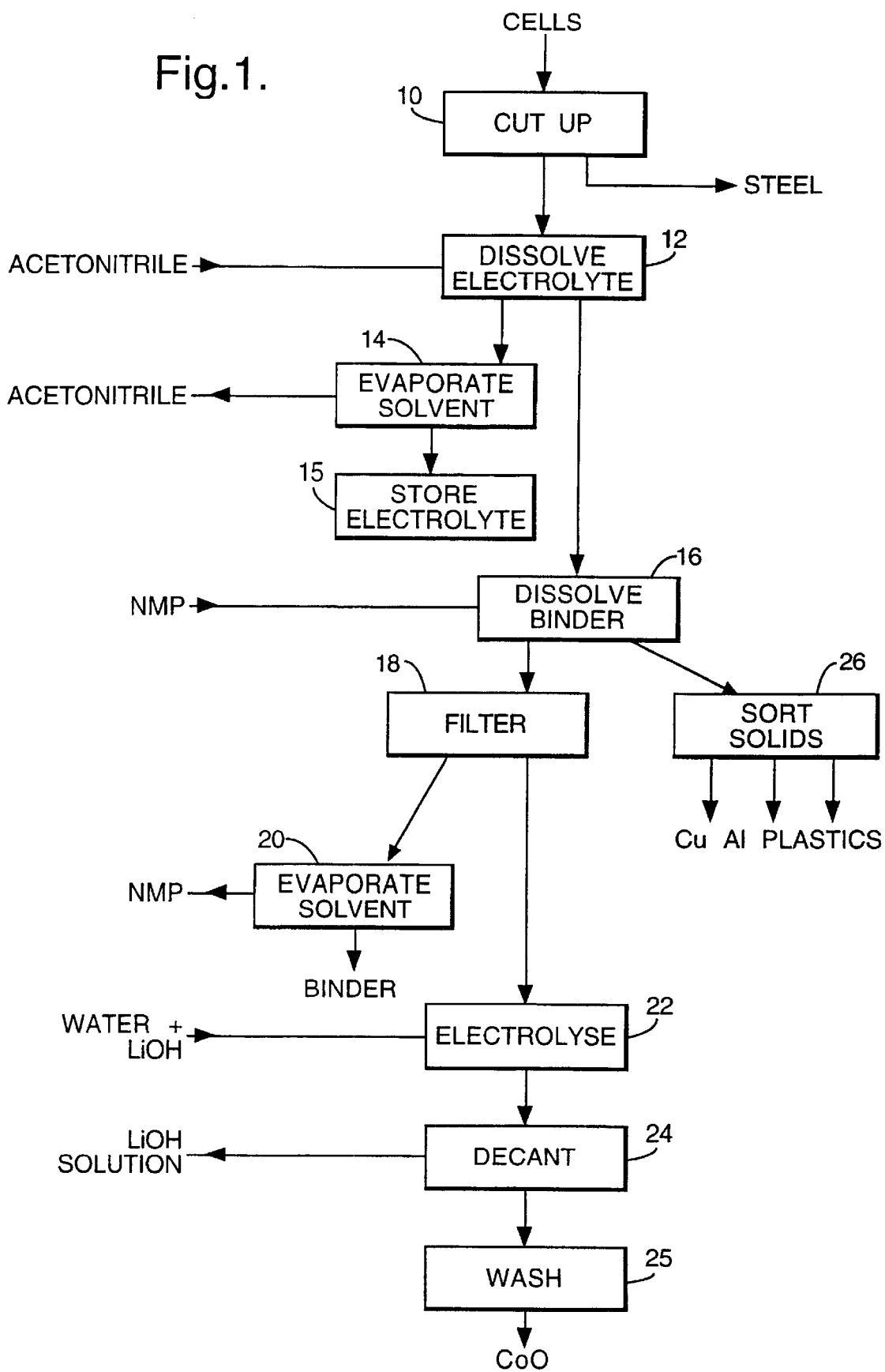
FIG. 1 shows a flow chart for the cell treatment process.

Referring to FIG. 1, the first step in the process is to cut up the cells in an inert atmosphere and in the absence of water (step 10), so that in the subsequent steps the solvents can contact the components of the cells. This process is desirably carried out in a dry nitrogen atmosphere, and the cutting may be performed using a laser, or mechanical shears for example. The casing is cut open and the other components, which are typically wound into a spiral, are removed. (In the process as described here, no further cutting is required at this stage; in a modification to the process, however, these other components are then further cut up or shredded to form small pieces typically one centimetre square, as described later.)

The spiral wound components (i.e. anode, separator, and cathode) are then placed in a mesh basket, each spiral being located on a spike, and the basket is enclosed in a transfer container containing a dry nitrogen atmosphere.

The basket containing the cell components is then transferred to a dissolver vessel purged with dry nitrogen, and the basket lowered to the base of the vessel. In the next step 12, an organic solvent, acetonitrile, is pumped into the dissolver vessel, warmed to 50° C., and recirculated through the vessel for a few hours to ensure that all the electrolyte and electrolyte solvent is dissolved. The acetonitrile is then pumped into an evaporator vessel, the pressure in the vessel lowered to below atmospheric pressure (e.g. 10 mm Hg), and the vessel heated to 50 or 60° C. to boil off the acetonitrile (step 14). The acetonitrile vapour is condensed and can be returned to a storage tank. The solution of electrolyte (lithium hexafluoro-phosphate) in electrolyte solvent (propylene carbonate etc.) may be stored for reuse (step 15).

NMP (N-methyl-pyrrolidone or 1-methyl-2-pyrrolidone) as a solvent for the binder is then pumped into the dissolver vessel, warmed to 50° C., and recirculated through the vessel for a few hours to ensure that all the binder has dissolved (step 16). The NMP containing the PVdF in solution and the particulate material in suspension is then drained out of the dissolver vessel and passed through a filter (step 18). The filtrate is pumped into an evaporator vessel, the pressure in the vessel may be lowered to below atmospheric pressure, and the vessel heated to say 90° C. to boil off the NMP (step 20). The NMP vapour is condensed and can be returned to a storage tank for subsequent use in the dissolver vessel.

The filter is then back-washed with water and the suspension of particulate material (lithium cobalt oxide and carbon) in water transferred to an electrolysis cell. The filter is then dried with nitrogen gas before reuse. In the electrolysis cell the lithium cobalt oxide is subjected to electrolytic reduction adjacent to the cathode of the cell, the cell electrolyte being a solution of lithium hydroxide in water (step 22), to form cobalt (II) oxide, and increasing the concentration of the lithium hydroxide solution. The reaction can be represented by the equation:

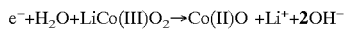

$$e^- + H_2O + LiCo(III)O_2 \rightarrow Co(II)O + Li^+ + 2OH^-$$

Finally, at step 24, the lithium hydroxide solution is decanted from the cell and the cobalt oxide and carbon mixture is washed (step 25) and removed for storage. It should be noted that although the carbon may initially contain intercalated lithium ions, these come out into solution when the carbon is in contact with water or aqueous lithium hydroxide solution without the need for any chemical treatment.

The solid materials remaining in the dissolver, i.e. copper foil, aluminium foil, and micro-porous plastic sheet, are then removed and can be sorted for storage (step 26). One way in which this may be performed is to shred the materials (if this has not been done already) and then separate them according to their densities. If steel is also present, it may be separated by its magnetic properties.

Figure 2:
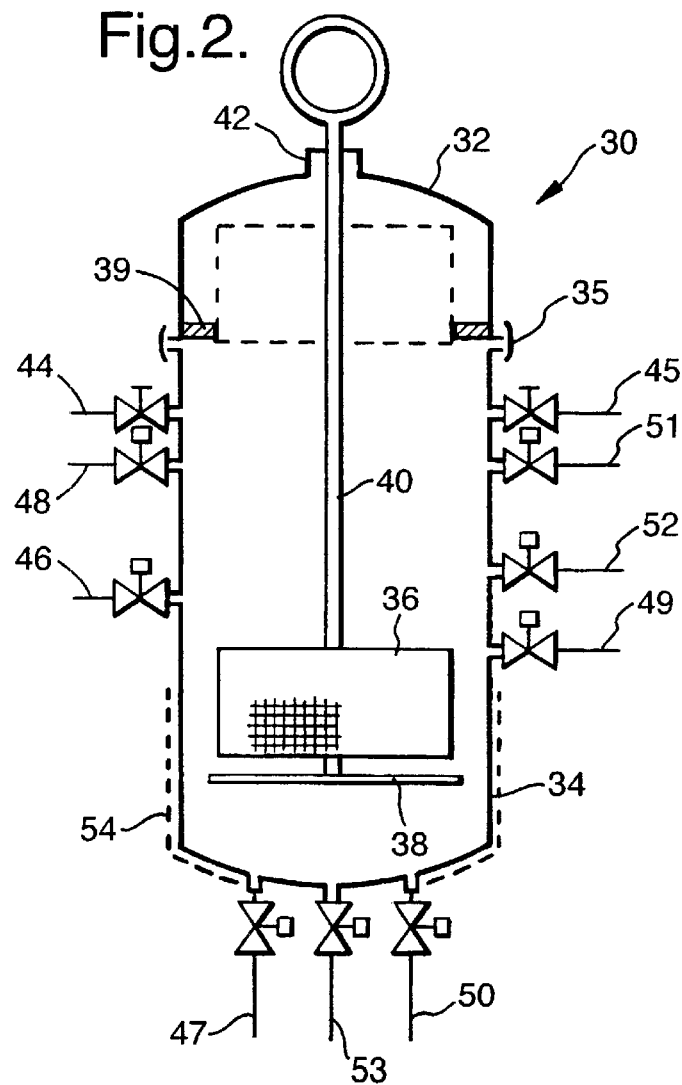
FIG. 2 shows, in diagrammatic sectional view, equipment for performing dissolution steps of the process of FIG. 1.

Referring now to FIG. 2, there is shown a dissolver vessel 30 suitable for performing the dissolution steps 12 and 16 described above. The vessel comprises a domed lid or upper portion 32 and a generally cylindrical lower portion with a curved base 34 which are sealed to each other at a flanged joint 35. The upper portion 32 encloses a mesh basket 36 above a base plate 38 which are both supported by a slide rod 40 which projects through a seal 42, the base plate 38 sealing to an inner flange 39, while the basket 36 is being transferred from the cutting up station (not shown) to the dissolver vessel 30; and after the upper portion 32 has been joined to the lower portion 34 the basket 36 along with the base plate 38 are lowered into the lower part of the lower portion 34 as shown. The lower portion 34 is provided with several valved inlets or outlets as follows: an inlet 44 for dry nitrogen, an outlet 45 connected to a gas extracting vent; an inlet 46 for acetonitrile, an outlet 47 in the base for acetonitrile, and a pressure equalisation duct 48 connected to the acetonitrile evaporator vessel (not shown); an inlet 49 for NMP, an outlet 50 in the base for NMP, and a pressure equalisation duct 51 connected to the NMP evaporator vessel (not shown); an inlet 52 for water and an outlet 53 in the base for water. The lower portion 34 is also provided with trace electrical heating 54 so that it its contents may be warmed to for example 50° C.

Thus in operation the upper portion 32 enclosing the basket 36 is sealed to the lower portion 34, and the lower portion 34 is thoroughly dried by purging with dry nitrogen via the inlet 44 and the outlet 45; the basket 36 is then lowered into the position shown. Acetonitrile is then circulated through the vessel 30, which is held at 50° C., via the inlet 46 and outlet 47; after three or four hours the inlet 46 is closed, the pressure equalisation duct 48 is opened, and the acetonitrile is pumped via the outlet 47 to the evaporator vessel. NMP is then circulated through the vessel 30, which is still held at 50° C., via the inlet 49 and outlet 50; after three or four hours the inlet 49 is closed, the pressure equalisation duct 51 is opened, and the NMP is pumped via the outlet 50 to the NMP evaporator vessel. Any remaining water-soluble salts can then be removed by washing with water via the inlet 52 and the outlet 53.

Figure 3:
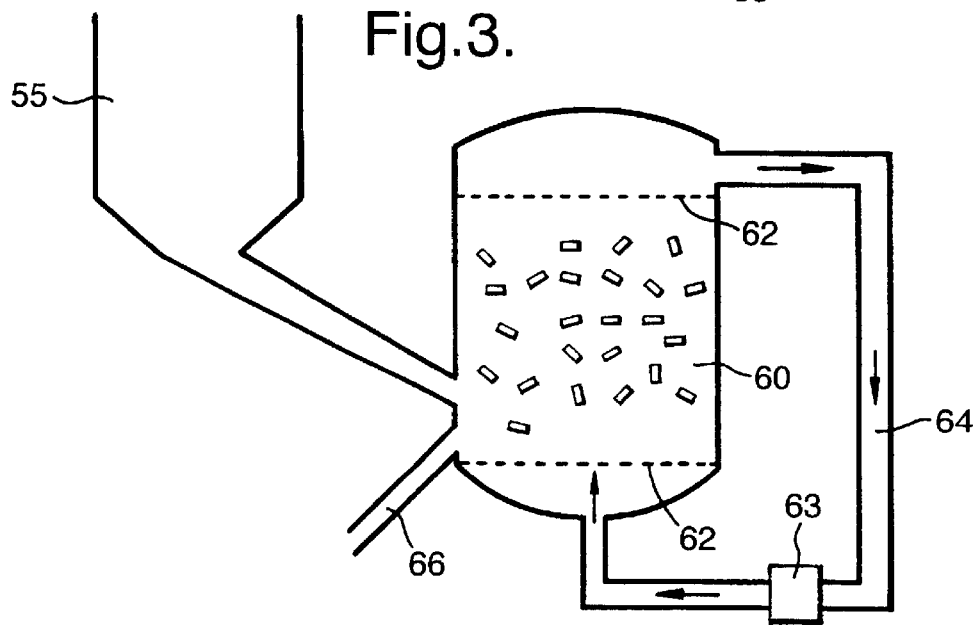
FIG. 3 shows, in diagrammatic sectional view, alternative equipment to that of FIG. 2.

It will be appreciated that the dissolution steps 12 and 16 might instead be performed in a different vessel. For example the cells might be shredded, either along with the casings or after removal of the casings, for example into pieces about 1 cm square, which might be processed in a fluidised bed vessel as shown in FIG. 3 to which reference is now made. The shredded pieces are fed via a hopper 55 into a dissolution chamber 60 defined between lower and upper mesh screens 62. An organic solvent such as acetonitrile is then circulated by a pump 63 and a duct 64 sufficiently vigorously that the pieces in the dissolution chamber 60 become fluidised. This may enable faster dissolution rates to be achieved than the dissolver vessel 30 described in relation to FIG. 2. When the dissolution process has been completed, the pieces can be removed via an exit duct 66.

Figure 4:
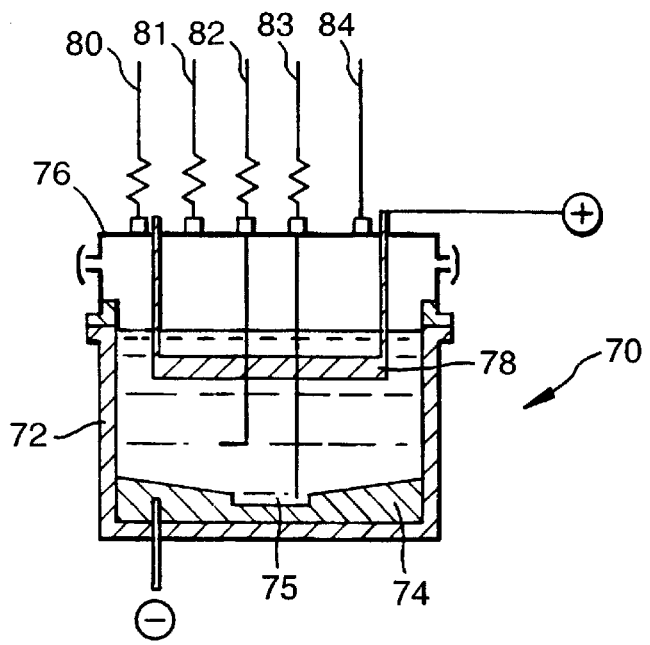
FIG. 4 shows, in diagrammatic sectional view, equipment for performing an electrochemical reduction step in the process of FIG. 1.

Referring now to FIG. 4 there is shown a cell 70 for the electrolytic reduction of the lithium cobalt oxide (step 22 in FIG. 1). The cell 70 comprises a generally cylindrical, plastic-lined steel vessel 72 with a flat base. On the base is a carbon electrode 74 whose upper surface slopes towards a central shallow recess 75. A lid 76 carries a platinized titanium electrode 78 and inlets and outlets as follows: an inlet 80 for lithium hydroxide solution, an inlet 81 for water and particles of carbon and lithium cobalt oxide from the filter (not shown), an outlet duct 82 for lithium hydroxide solution which extends to a position well above the electrode 74, an outlet duct 83 for lithium hydroxide solution and treated particles, which extends into the central recess 75, and an outlet duct 84 for any gases generated during electrolysis.

In operation a mixture of carbon and lithium cobalt oxide particles washed off the filter by a stream of water flows into the cell 70 via the inlet 81 and settles out to form a bed on the electrode 74. Aqueous lithium hydroxide solution is supplied via the inlet 80 so the liquid level is above the electrode 78. A voltage of about 2.0 volts is then applied between the carbon electrode 74 as cathode and the other electrode 78 as anode, the voltage being such as to restrict hydrogen generation, and electrolysis is continued until the electric current decreases significantly. This indicates that the electrolytic reduction of the lithium cobalt oxide has been substantially completed. The electric current is then stopped, and most of the lithium hydroxide electrolyte in the cell is extracted through the duct 82 (whose open end is slightly above the top of the particle bed). The remaining lithium hydroxide solution along with all the particles are then extracted via the duct 83 to a filter (not shown). The particles of carbon and cobalt (II) oxide can then be washed off the filter with water, and stored for reuse.

Figure 5:
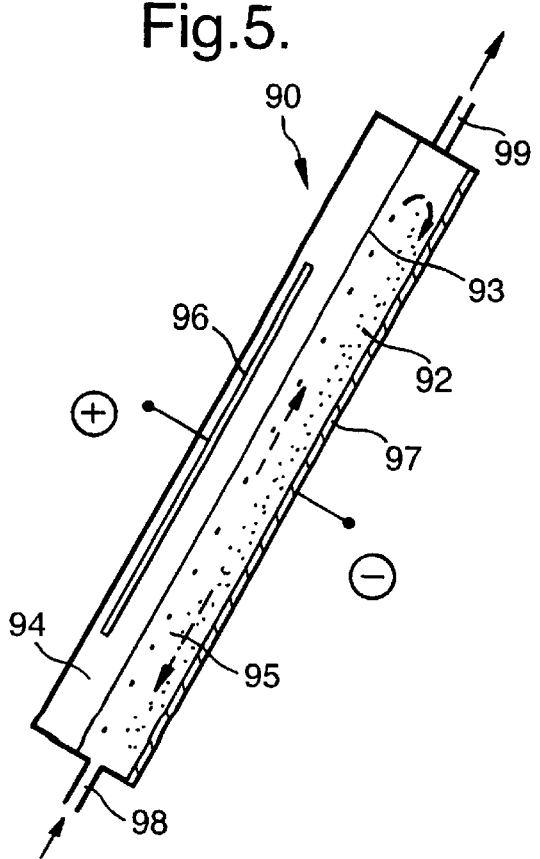
FIG. 5 shows, in diagrammatic sectional view, alternative equipment to that of FIG. 4.

It will also be appreciated that this electrolytic production process might be carried out in a different cell, for example a fluidised bed, or a divided cell 90 with a circulating particle bed electrode 92 as its cathode, as shown diagrammatically in FIG. 5 to which reference is now made. In the cell 90 a membrane 93 separates the anolyte region 94 from the catholyte region 95, and these are inclined at an angle to the vertical. A platinized titanium electrode 96 is provided as the anode, and an anolyte such as aqueous lithium hydroxide is passed through the region 94. A carbon cathodic plate 97 forms the rear surface of the region 95 and a catholyte, which may also be lithium hydroxide solution, is pumped upwardly through the catholyte region 95 between an inlet 98 and an outlet 99; the particles are introduced into the catholyte region 95, and the electrolyte flow is sufficiently vigorous that the particles circulate upwardly adjacent to the membrane 93, and then downwardly as a flowing packed bed 92 over the cathode plate 97. A voltage of about 1.75 volts is applied between the electrodes 96 and 97, and lithium cobalt oxide is reduced to cobalt (II) oxide. Such a circulating particle bed electrode is described by F. Goodridge et al (Electrochim. Acta 22 (1977) 1087), and in U.S. Pat. Nos. 3,945,892 and 3,981,787 (G.S. James et al).

It will be appreciated that the process of the invention may be modified in various ways. For example if the electrolyte solvent obtained at step 15 is a mixture, for example containing diethyl carbonate, dimethyl carbonate and propylene carbonate, then the first two (DEC and DMC) can be extracted by distillation at reduced pressure.

It will also be appreciated that the process is equally applicable to lithium ion polymer cells, which have a polymer electrolyte in place of the separator and liquid electrolyte. If the polymer electrolyte contains PVdF then it will be dissolved out by the NMP along with the electrode binder (at step 16). If it contains a different polymer then the solvents would have to be selected accordingly.

What is claimed is:

1. A process for treating cell components comprising particulate cathode material and a binder, the process comprising the following steps:
    a) cutting up the cell components in an inert atmosphere and in the absence of water;
    b) then contacting the cell components with a solvent for the binder, and thereby separating the particulate material; and
    c) reducing the particulate cathode material to remove intercalated ions.

2. A process as claimed in claim 1 wherein the particulate cathode material is reduced electrochemically.

3. A process as claimed in claim 2 wherein the particulate material is electrochemically reduced at a circulating particulate bed electrode.

4. A process as claimed in claim 1 wherein the dissolution process involves re-circulating the solvent through a vessel containing the cut up cell components.

5. A process as claimed in claim 4 wherein the solvent is recirculated sufficiently vigorously that the cut up cell components form a fluidised bed.

6. A process for treating cells, each cell including particulate cathode material and a binder, an electrolyte, and an anode material, the process comprising the following steps:
    a) cutting up the cells in an inert atmosphere and in the absence of water;
    b) contacting the cells with an organic solvent so as to dissolve out the electrolyte and any electrolyte solvent;
    c) then contacting the cells with a solvent for the binder, and thereby separating the particulate material; and
    d) reducing the particulate cathode material to remove intercalated ions.

7. A process as claimed in claim 6 wherein the particulate cathode material is reduced electrochemically.

8. A process as claimed in claim 7 wherein the particulate material is electrochemically reduced at a circulating particulate bed electrode.

9. A process as claimed in claim 6 wherein at least one dissolution process involves recirculating the solvent through a vessel containing the cut up cells.

10. A process as claimed in claim 9 wherein the solvent is recirculated sufficiently vigorously that the cut up cells form a fluidised bed.

* * * * *

UNITED STATES PATENT AND TRADEMARK OFFICE
CERTIFICATE OF CORRECTION

PATENT NO.     : 6,447,669 B1
DATED          : September 10, 2002
INVENTOR(S)    : Michael Jonathan Lain It is certified that error appears in the above-identified patent and that said Letters Patent is hereby corrected as shown below:

<u>Title page,</u>
Item [30], Foreign Application Priority Data, "Dec. 3, 1997," is changed to
-- Dec. 23, 1997 --.

Signed and Sealed this

Tenth Day of December, 2002

JAMES E. ROGAN
*Director of the United States Patent and Trademark Office*